United States Patent [19]
Schweizer et al.

[11] Patent Number: 6,004,650
[45] Date of Patent: *Dec. 21, 1999

[54] FIBER REINFORCED COMPOSITE PART AND METHOD OF MAKING SAME

[75] Inventors: Robert A. Schweizer, Granville; Sheri L. Whisler, Gahanna, both of Ohio

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,864

[22] Filed: Dec. 31, 1996

[51] Int. Cl.⁶ ........................................ B32B 5/12
[52] U.S. Cl. ................... 428/107; 428/105; 264/257; 264/258; 264/320; 264/325
[58] Field of Search .................. 264/257, 258, 264/320, 325; 428/105; 442/330, 331, 333, 394

[56] References Cited

U.S. PATENT DOCUMENTS

| | | |
|---|---|---|
| 1,309,668 | 7/1919 | Waite . |
| 1,979,954 | 11/1934 | Bergman . |
| 2,185,924 | 1/1940 | de V. Pereira . |
| 2,425,883 | 8/1947 | Jackson . |
| 2,577,205 | 12/1951 | Meyer et al. . |
| 3,042,570 | 7/1962 | Bradt . |
| 3,077,426 | 2/1963 | Johnston . |
| 3,382,302 | 5/1968 | Marzocchi . |
| 3,684,345 | 8/1972 | Temple et al. . |
| 3,927,165 | 12/1975 | Grochol et al. . |
| 4,044,188 | 8/1977 | Segal ...................................... 428/283 |
| 4,088,525 | 5/1978 | Gowetski et al. . |
| 4,127,636 | 11/1978 | Flanders . |
| 4,234,633 | 11/1980 | Gowetski et al. . |
| 4,957,684 | 9/1990 | Kia . |
| 5,035,602 | 7/1991 | Johnson . |
| 5,132,070 | 7/1992 | Paul et al. . |
| 5,176,775 | 1/1993 | Montsinger . |
| 5,185,117 | 2/1993 | Hawley . |
| 5,248,467 | 9/1993 | Cushman . |
| 5,286,326 | 2/1994 | Greve . |
| 5,312,669 | 5/1994 | Bedard ..................................... 428/105 |
| 5,324,377 | 6/1994 | Davies . |
| 5,358,583 | 10/1994 | Hatchadoorian et al. . |
| 5,358,680 | 10/1994 | Boissonnat et al. . |
| 5,364,686 | 11/1994 | Disselbeck et al. . |
| 5,389,440 | 2/1995 | Arpin et al. . |
| 5,391,344 | 2/1995 | Rains et al. . |
| 5,395,574 | 3/1995 | Gonthier et al. . |
| 5,401,154 | 3/1995 | Sargent ..................................... 425/114 |
| 5,425,796 | 6/1995 | Loubinouz et al. . |
| 5,431,555 | 7/1995 | Boissonnat et al. . |
| 5,443,611 | 8/1995 | Salvador et al. . |
| 5,451,355 | 9/1995 | Boissonnat et al. . |
| 5,454,846 | 10/1995 | Roncato et al. . |
| 5,470,658 | 11/1995 | Gasca et al. . |
| 5,486,416 | 1/1996 | Johnson et al. . |

OTHER PUBLICATIONS

Technopolymer Structures, GE Plastics, AZDEL®, AZMET®, AZLOY® Composites. (No Date).

AZDEl® Sheet Technical Guide, Azdel, Inc., TPSS–16–Revision 3. (No Date).

"Metal Replacements" by Vicki P. McConnell, Plastic Design Forum Nov./Dec. 1989.

"Sheet Molding Compound Glass Fibers" by Dana et al. pp. 117–134 (No Date).

*Primary Examiner*—Christopher Raimund
*Attorney, Agent, or Firm*—Inger H. Eckert

[57] ABSTRACT

A method is provided for making a composite part. The method comprises the steps of: providing continuous strand material including continuous reinforcing fibers; providing a mold having an inner cavity; placing the continuous strand material in the mold cavity; providing a composite material containing discontinuous reinforcing fibers; adding the composite material to the mold cavity; and molding a composite part from the composite material and the strand material such that the part is reinforced by continuous and discontinuous reinforcing fibers.

12 Claims, 3 Drawing Sheets

FIBER REINFORCED COMPOSITE PART AND METHOD OF MAKING SAME

TECHNICAL FIELD AND INDUSTRIAL APPLICABILITY OF THE INVENTION

The present invention relates to the manufacture of reinforced composite parts. Particularly, the invention relates to composite parts reinforced with continuous and discontinuous reinforcing fibers so as to have enhanced mechanical properties and processes for forming same.

BACKGROUND OF THE INVENTION

U.S. Pat. No. 5,185,117, assigned to Composite Products, Inc., describes a process for compounding thermoplastic matrix material and reinforcing fibers. This process yields a reinforced matrix material containing discrete or discontinuous reinforcing fibers. The reinforced matrix material is adapted for use in a compression molding process to form a composite part. However, due to the short lengths of the fibers in the matrix material, the strength of resulting parts is not sufficient for some desired product applications, e.g., higher performing automotive bumper beams.

It is known to add a composite material comprising a thermoplastic matrix material reinforced with a continuous strand mat into a mold to form a part. The mat reinforcing fibers are embedded within the matrix material. Because the reinforcing fibers are embedded within the matrix material, it is difficult to selectively place continuous reinforcing fibers in specific portions of a mold so as to form a part having a desired quantity and orientation of continuous reinforcing fibers in selected locations within the part.

Accordingly, there is a need for an improved molding process which produces composite parts having improved mechanical properties.

SUMMARY OF THE INVENTION

In accordance with the present invention, a process is provided for forming composite parts having enhanced mechanical properties. The method of the present invention involves selectively placing continuous strand material comprising continuous reinforcing fibers into a mold cavity, adding a composite material comprising discrete reinforcing fibers and a thermoplastic matrix material into the mold cavity, and molding a composite part from the continuous strand material and the composite material. Hence, by selectively placing continuous strand material in preselected locations within the mold, parts having enhanced mechanical properties in desired areas, due to continuous reinforcing fibers being located in those areas, can be formed. Further, when the continuous strand material comprises continuous reinforcing fibers in combination with a thermoplastic matrix material, substantially full wetting of the continuous reinforcing fibers by the thermoplastic material will occur during the molding process.

In accordance with a first aspect of the present invention, a method is provided for making a composite part. The method comprises the steps of: providing continuous strand material including continuous reinforcing fibers; providing a mold having an inner cavity; placing the continuous strand material in the mold cavity; providing a composite material containing discontinuous reinforcing fibers; adding the composite material to the mold cavity; and molding a composite part from the composite material and the strand material such that the part is reinforced by continuous and discontinuous reinforcing fibers.

The continuous strand material preferably comprises commingled reinforcing and polymer fiber strands, reinforcing strands coated with a polymeric material or a mat formed from composite strands.

In accordance with a second aspect of the present invention, a composite part is formed by a process comprising the steps of: providing continuous strand material including continuous reinforcing fibers; providing a mold having an inner cavity; placing the continuous strand material in the mold cavity; providing a composite material containing discontinuous reinforcing fibers; adding the composite material to the mold cavity; and molding a composite part from the composite material and the strand material such that the part is reinforced by continuous and discontinuous reinforcing fibers.

In accordance with a third aspect of the present invention, a composite part is formed via a process comprising the steps of: providing a reinforcement mat including continuous reinforcing fibers; providing a mold having an inner cavity; placing the mat in the mold cavity; providing a composite material containing discontinuous reinforcing fibers; adding the composite material to the mold cavity; and molding a composite part from the composite material and the mat.

Accordingly, it is an object of the present invention to provide a composite part having improved mechanical properties. It is further an object of the present invention to provide a method for producing a composite part having continuous and discontinuous reinforcing fibers. These and other objects and advantages of the present invention will become apparent from the following detailed description, accompanying drawings and appended claims.

DETAILED DESCRIPTION AND PREFERRED EMBODIMENTS OF THE INVENTION

Figure 1:
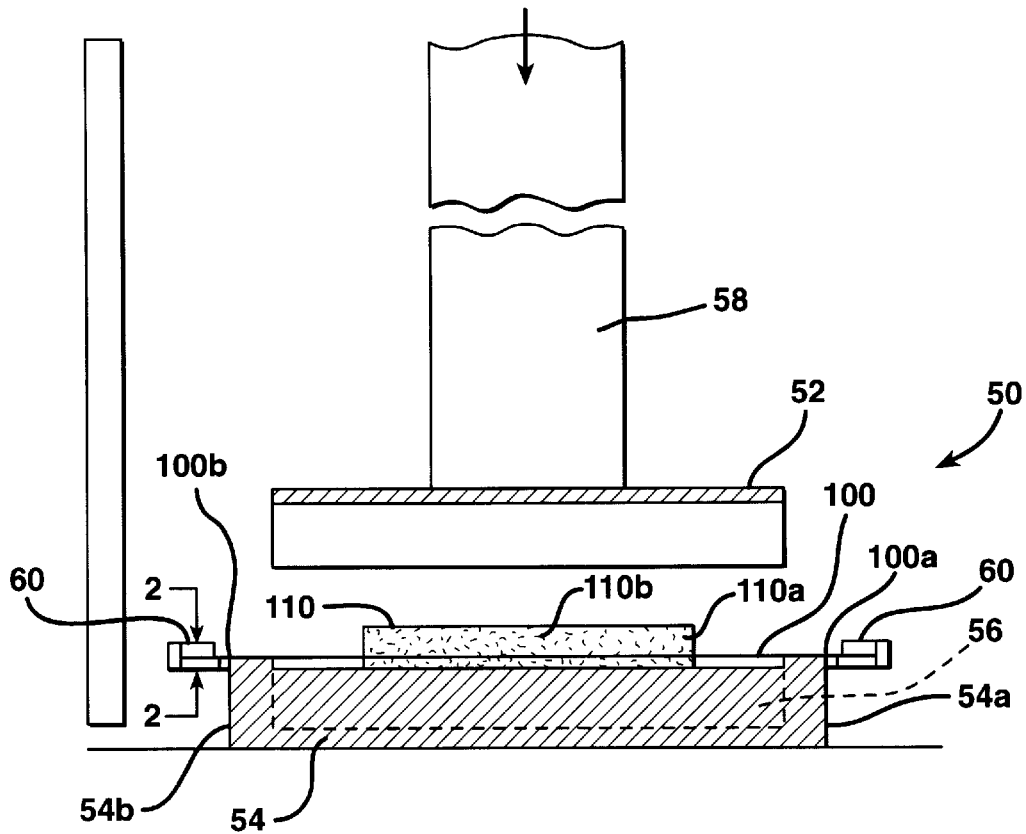
FIG. 1 is a cross-sectional view of a compression mold useful with this invention.

The present invention provides a method for making a fiber reinforced composite part. The part has continuous (primary) and discontinuous (secondary) reinforcing fibers embedded within a thermoplastic matrix material. Preferably, the continuous strand fibers are aligned in a generally uniform orientation in the matrix material while the discontinuous fibers are generally randomly oriented in the matrix material.

Throughout this specification certain strand material or fibers are referred to as being "continuous." "Continuous" strand material or fibers have relatively large aspect ratios (ratio of length to diameter). The actual length of such strand material or fibers is determined by the use to which it will be put in forming a particular part. Preferably, such "continuous" strand material or fibers will have a length greater than or equal to two inches (5.08 cm).

Throughout this specification, certain fibers are referred to as being "discontinuous." A discontinuous fiber is one which has a length of less than about two inches (5.08 cm).

To form a reinforced composite part in accordance with the present invention, continuous strand material is selectively positioned in a mold, a composite material is subsequently added to the mold and a molding operation is performed such that a composite part is molded having continuous and discontinuous reinforcing fibers embedded within a polymeric matrix material, typically a thermoplastic matrix material. In a preferred embodiment, the continuous strand 35material comprises continuous reinforcing fibers and first polymeric material. Examples of suitable continuous reinforcing fibers include E-glass fibers, S-glass fibers, graphite fibers, metal or metal coated fibers, aramid fibers, silicon carbide fibers and other fibers having suitable reinforcing characteristics. Examples of suitable first polymeric materials include thermoplastic materials such as polyamides, polypropylenes, polyesters, polyethylenes, polyphenylene sulfides and other like thermoplastic materials.

The first polymeric material may be in the form of polymeric fibers which are commingled or combined with one or more reinforcing fibers to form the continuous strand material. Methods for making commingled reinforcing and polymer fiber strands are disclosed in detail in copending U.S. patent application Ser. No. 08/311,817 filed Sep. 26, 1994 (Attorney Docket 23422A), now U.S. Pat. No. 5,626,643, and entitled "METHOD AND APPARATUS FOR FORMING COMPOSITE STRANDS, by Andrew B. Woodside et al." The applicants incorporate herein by reference the '817 application in its entirety. The commingled reinforcing and polymer fiber strands may be selectively placed within a mold. Alternatively, the commingled strands may be first formed into a mat which is later placed within the mold. A process for making such a reinforcement mat and a description of the mat itself are set out in copending U.S. patent application Ser. No. 08/713,319 (Attorney Docket No. 24084A), filed Sep. 13, 1996, and entitled, "PROCESS AND APPARATUS FOR MAKING A REINFORCING MAT," abandoned, by Ronald G. Krueger, and in copending U.S. patent application Ser. No. 08/713,318 (Attorney Docket No. 23689A), filed Sep. 13, 1996, now U.S. Pat. No. 5,789,078 and entitled, "A REINFORCEMENT MAT, by Sheri L. Eikleberry et al.," which applications are incorporated herein by reference in their entirety.

Alternatively, the continuous strand material may comprise strands of reinforcing fibers having a polymeric material coated thereon or strands of reinforcing and matrix fibers having a polymeric material coated thereon such as those disclosed in copending U.S. patent application Ser. No. 08/695,909, filed Aug. 12, 1996, pending, and entitled "CHEMICAL TREATMENTS FOR FIBERS AND WIRE-COATED COMPOSITE STRANDS FOR MOLDING FIBER-REINFORCED THERMOPLASTIC COMPOSITE ARTICLES," by Andrew B. Woodside, and in copending U.S. patent application Ser. No. 08/695,504, filed Aug. 12, 1996, pending, and entitled "CHEMICAL TREATMENTS FOR FIBERS AND WIRE-COATED COMPOSITE STRANDS FOR MOLDING FIBER-REINFORCED THERMOPLASTIC COMPOSITE 5ARTICLES," by Andrew B. Woodside, the disclosures of which are hereby incorporated by reference.

Because the continuous reinforcing fibers of the continuous strand material are combined with a thermoplastic matrix material in the preferred embodiment, substantially full wetting of the continuous reinforcing fibers will occur during the molding process.

For some applications continuous strand material comprising only reinforcing fibers may be used, i.e., without any polymeric material combined with the reinforcing fibers. When only reinforcing fibers are employed, the fibers should be oriented and clamped in position in the mold so that maximum wetting of those fibers occurs by a second polymeric material in the composite material.

The composite material comprises second polymeric material and discontinuous reinforcing fibers. The discontinuous reinforcing fibers may comprise E-glass or S-glass fibers or synthetic fibers such as aramid, graphite and silicon carbide fibers, metal or metal coated fibers or other fibers having suitable reinforcing characteristics. Preferably, the second polymeric material of the composite material comprises a polymeric material which is compatible with the first polymeric material of the continuous strand material. By "compatible," it is meant that the first and second polymeric materials are able to sufficiently interact and bond with one another so as not to adversely affect the overall properties of the resulting composite part. Useful second polymeric materials include thermoplastic materials such as polyamides, polypropylenes, polyesters, polyethylenes and polyphenylene sulfides. A preferred process for making such a composite material is described in U.S. Pat. No. 5,185,117, assigned to Composite Products, Inc., the disclosure of which is hereby incorporated by reference in its entirety.

It should be noted that the sizing composition coated on the continuous and discontinuous reinforcing fibers should be compatible with the first and second polymeric materials.

Referring now to FIG. 1, a heated compression mold 50 adapted for use in forming a composite part 10 in accordance with the present invention is shown. The mold 50 comprises a reciprocating upper press plate 52 and a fixed base 54. In the illustrated embodiment, a generally U-shaped inner cavity 56 is defined in the base 54. A conventional hydraulic or pneumatic piston/cylinder unit 58 is coupled to the upper press plate 52 for effecting reciprocating movement of the upper press plate 52 relative to the base 54.

In the illustrated embodiment, two clamps 60 are attached to opposing sides 54a and 54b of the base 54 for clamping continuous strand material 100 to the base 54. The two clamps 60 may extend along the entire extent of the two sides 54a and 54b.

Figure 2:
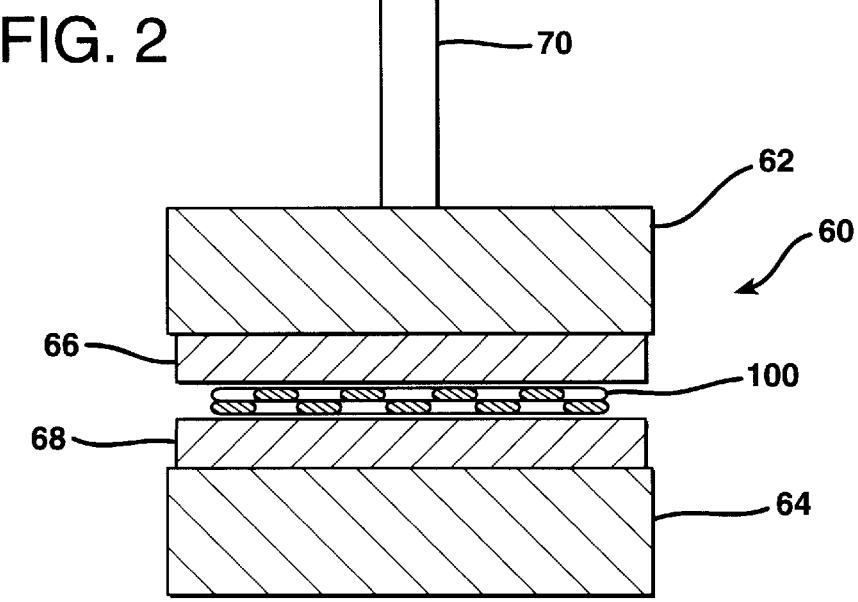
FIG. 2 is a cross-sectional view of a clamp forming part of the mold illustrated in FIG. 1.

As shown in FIG. 2, each clamp 60 comprises first and second opposing plate portions 62 and 64. A first pad 66 is mounted to the first plate portion 62. A second pad 68 is mounted to the second plate portion 64. The pads 66 and 68 are preferably formed from a deformable elastomeric material. In the illustrated embodiment, a pneumatic piston/cylinder unit 70 is coupled to the first plate portion 62 to effect reciprocating movement of the first plate portion 62 relative to the second plate portion 64.

The continuous strand material 100, after being selectively placed within the inner cavity 56, is clamped at its opposing ends between the first and second pads 66 and 68 of the two clamps 60. The strand material 100 is clamped to prevent it from substantially moving within the inner cavity 56 during the molding process. A hydraulic piston/cylinder unit (not shown) may be provided in place of the pneumatic piston/cylinder unit 70. Further, a mechanical screw arrangement (not shown) or other mechanical or electrical device may be provided in place of the unit 70 to effect movement of the first and second plate portions 62 and 64 toward and away from one another. It is additionally contemplated that clamps 60 may be provided about the entire outer periphery of the base 54 or along any portion of the outer periphery of the base 54.

The process for forming a composite part 10, (see FIGS. 4 and 5) using the press 50 will now be described. Initially, strand material 100 is selectively placed within the inner cavity 56 of the mold 50 and opposing ends 100*a* and 100*b* of the strand material 100 are clamped to the base 54 via clamps 60. The ends of the strand material 100 are clamped to prevent the strand material from being substantially displaced within the inner cavity 56 during the molding process.

Figure 3:
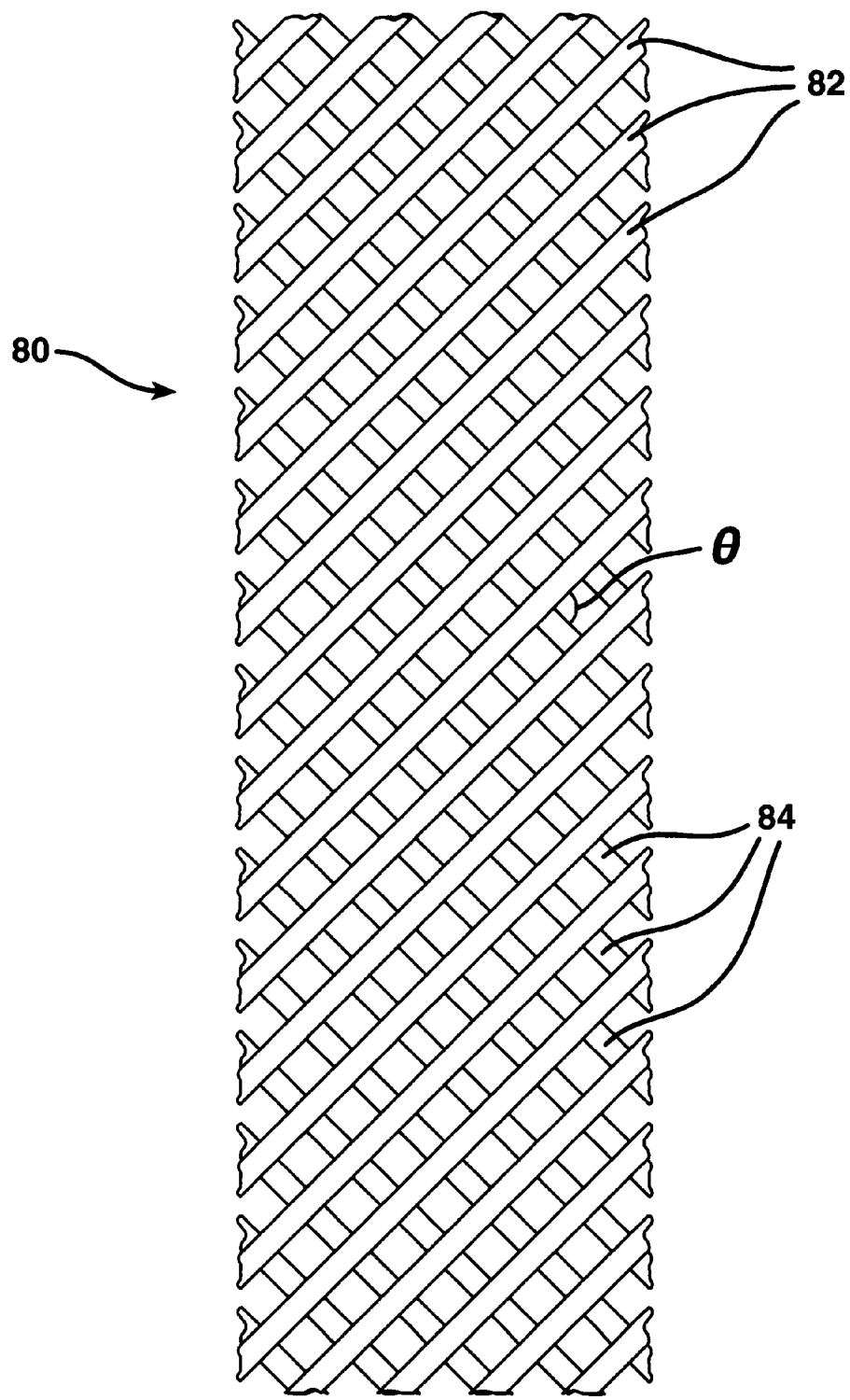
FIG. 3 is a top view of a reinforcement mat adapted for use in forming a composite part in accordance with the present invention.

In the illustrated embodiment, the strand material 100 comprises a reinforcement mat 80 formed from a plurality of first and second commingled reinforcing and polymer fiber strands 82 and 84, respectively (see FIG. 3). The first and second strands 82 and 84 typically have lengths which exceed two inches and, hence, are considered "continuous" strands. The plurality of first and second strands 82 and 84 are positioned relative to one another such that an angle Θ between any two strands 82 and 84 is from about 60 to about 174° and, more preferably, from about 60° to about 120°. During the mat forming process, the strands 82 and 84 are brought together and heated such that at least a portion of the polymer fibers incorporated into the strands 82 and 84 bond together so as to join the strands 82 and 84 to one another to form the mat 80. The process for forming such a mat 80 and a description of the mat 80 are set out in the U.S. patent applications Ser. No. 08/713,319, abandoned, entitled "PROCESS AND APPARATUS FOR MAKING A REINFORCING MAT" and Ser. No. 08/713,318, now U.S. Pat. No. 5,789,078, entitled "REINFORCEMENT MAT," which applications are incorporated herein by reference above. It is further contemplated that a polymeric film material (not shown) or additionally commingled strands (not shown) running lengthwise or in the machine direction of the mat 80 may be used to bond the strands 82 and 84 to one another.

After the strand material 100 has been selectively placed within the inner cavity 56 and clamped to the base 54 via the clamps 60, composite material 110 is added to the inner cavity 56. As set out above, the composite material 110 comprises a second polymeric material 110*a* and a plurality of discontinuous reinforcing fibers 110*b*. The composite material 110 comprises a bulk molding compound in the illustrated embodiment, but may alternatively be in sheet form, i.e., may comprise sheet molding compound.

Preferably, the mold 50 is maintained at an elevated temperature, e.g., at a temperature of about 120° F. (49° C.) to about 180° F. (82° C.), during the molding process to prevent the first and second polymeric materials, both thermoplastic materials in the illustrated embodiment, from solidifying too quickly during the molding process. Typically, the composite material 110 is heated to the melting temperature of the second polymeric material. The melting temperature of the second polymeric material is typically provided by the supplier of the polymeric material. For example, if the composite material includes polypropylene, the composite material 110 is heated to a temperature of about 400° F. (204° C.) to about 450° F. (232° C.) before it is added to the mold cavity 56. The composite material 110 may be heated in an extruder as discussed in U.S. Pat. No. 5,185,117.

After the composite material 110 has been added to the inner cavity 56, the piston/cylinder unit 58 is caused to move the upper press plate 52 into engagement with the base 54 and the composite material 110 is allowed to flow, filling the inner cavity 56. The first polymeric material incorporated into the strand material 100 receives energy in the form of heat from the heated composite material 110. Hence, the first and second polymeric materials flow sufficiently within the mold cavity 56 to ensure substantially full wetting of both the continuous reinforcing fibers of the strand material 100 and the discrete fibers of the composite material 110. The relatively cold temperature of the mold 50 causes the first and second polymeric materials to solidify rapidly. The upper press plate 52 is then moved to its retracted position and the part is removed. The ends of the reinforcing fibers extending from the resulting part are severed to provide the part with a smooth outer surface.

Figure 4:
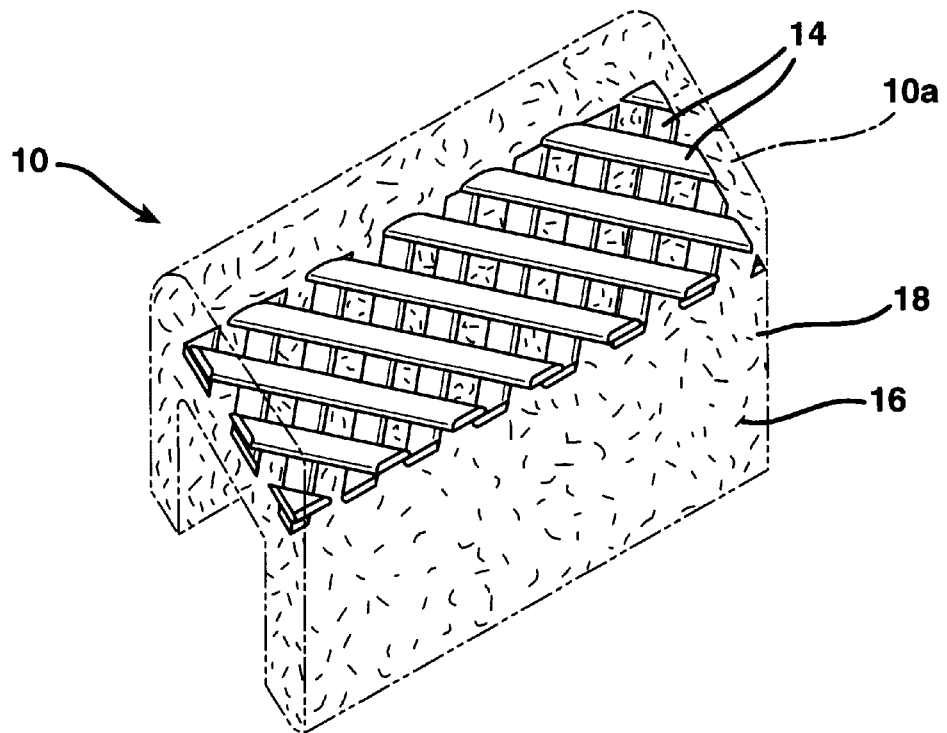
FIG. 4 is a perspective view of a part formed in accordance with the present invention.
Figure 5:
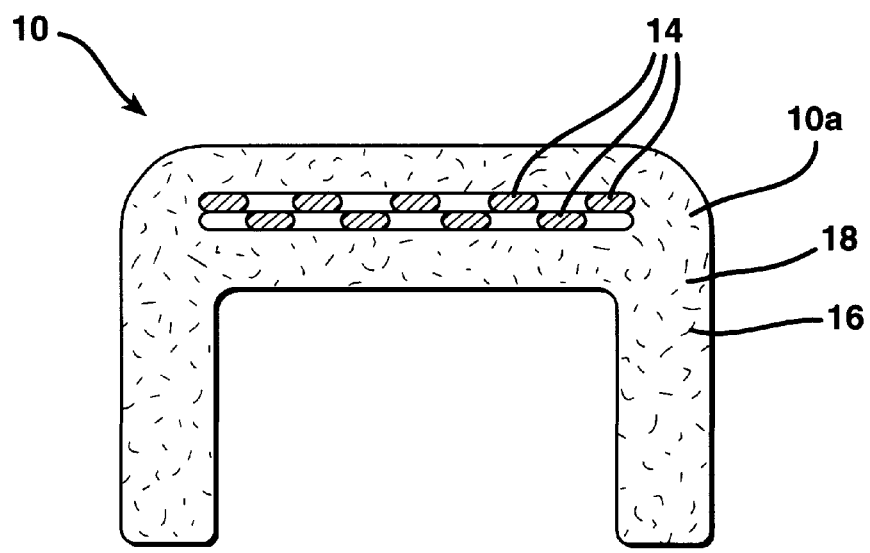
FIG. 5 is a cross-sectional view of the part illustrated in FIG. 4.

The resulting composite part 10, which comprises an automobile bumper beam in the illustrated embodiment, is shown in FIGS. 4 and 5. It includes a polymeric matrix material 18 which is formed from the first and second polymeric materials incorporated into the continuous strand material 100 and the composite material 110. The part 10 further includes continuous reinforcing fibers 14 embedded within the polymeric matrix material 18 in an upper portion 10*a* of the part 10. The fibers 14 are the reinforcing fibers forming part of the continuous strand material 100 previously placed in the mold 50.

The part 10 additionally includes discontinuous or discrete fibers 16 embedded throughout the polymeric matrix material 18. The fibers 16 are the discontinuous fibers forming part of the composite material 110 previously placed in the mold 50.

The strand material 100 was selectively placed within the mold 50 so as to provide reinforcing fibers 14 in the upper portion 10*a* of the part 10, the portion 10*a* most likely to receive an applied stress. Thus, in accordance with the present invention, the strand material 100 is selectively placed within the inner cavity 56 of a mold 50 so that continuous reinforcing fibers 14 reinforce the resulting part 10 in specific locations such that the part can most efficiently resist anticipated stresses to which it might be subjected during its useful life. The discontinuous fibers 16 are randomly located and oriented in the matrix material 18 to provide increased overall strength to the part 10.

It is also contemplated that the strand material 100 may comprise commingled or combined reinforcing and polymer fiber strands or reinforcing fibers coated with a polymeric material, as discussed above. Such strand material 100 may be selectively placed within the inner cavity 56 in a manner such that the continuous reinforcing fibers 14 in the strand material 100 provide an oriented, unidirectional reinforcement within the resulting part 10. It is additionally contemplated that first strands of the strand material 100 may be placed lengthwise in the inner cavity 56 and additional strands of the strand material 100 may be placed at an angle, e.g., from 1° to 90°, to the first strands so as to provide improved strength in directions off axis to the direction of support provided by the first strands. Other angular orientations of the strand material are also possible.

It is further contemplated that the strand material may be placed in the inner cavity 56 of the mold 50 and not clamped to the base 54 or any other portion of the mold 50.

It is additionally contemplated that the part 10 may be formed via another molding processes, such as a transfer molding process.

The process set out herein is useful in making automotive parts such as bumper beams, instrument panels and seat backs, as well as various other applications to numerous to describe herein. Accordingly, while certain representative embodiments and details have been shown for the purpose of illustrating the invention, it will be apparent to those skilled in the art that various changes in the product and processes described herein may be made without departing from the scope of the invention, which is defined in the appended claims.

What is claimed is:

1. A composite part produced by the process comprising the steps of:
   providing continuous strand material including commingled substantially linear, continuous reinforcing fibers and polymer fibers, said polymer fibers being adapted to form part of the matrix material of said composite part;
   providing a mold having a cavity;
   selectively placing said continuous strand material in preselected locations in said mold cavity;
   providing a composite material containing discontinuous reinforcing fibers and a polymeric material;
   adding said composite material to said mold cavity; and
   molding a composite part from said composite material and said strand material, said part having enhanced mechanical properties in desired areas due to said continuous strand material being located in said desired areas.

2. The part of claim 1, wherein said placing step includes the step of clamping said continuous strand material to outer edge portions of said mold beyond said mold cavity such that a substantial portion of said strand material extends into said mold cavity.

3. The part of claim 1, wherein said continuous strand material comprises a mat formed from continuous composite strands.

4. The part of claim 1, wherein said continuous reinforcing fibers are selected from the group consisting of E-glass fibers, S-glass fibers, graphite fibers, aramid fibers and silicon carbide fibers.

5. The part of claim 1, wherein said polymer fiber strands are formed from a polymeric material selected from the group consisting of polyamides, polypropylenes, polyesters, polyethylenes, and polyphenylene sulfides.

6. The part of claim 1, wherein said discontinuous fibers are selected from the group consisting of E-glass fibers, S-glass fibers, graphite fibers, aramid fibers and silicon carbide fibers.

7. The part of claim 1, wherein said discontinuous fibers are randomly located and oriented throughout said part.

8. A composite part produced by the process comprising the steps of:
   providing a reinforcing mat formed from a plurality of first and second reinforcing fibers, said first fibers being angularly positioned relative to said second fibers;
   providing a mold having a cavity;
   selectively placing said mat in preselected locations in said mold cavity;
   providing a composite material containing discontinuous reinforcing fibers;
   adding said composite material to said mold cavity; and
   molding a composite part from said composite material and said mat, said part having enhanced mechanical properties in desired areas due to said mat being located in said desired areas.

9. The part of claim 8, wherein an angle between any two first and second strands is from about 6° to about 174°.

10. The part of claim 8, wherein said discontinuous fibers are randomly located and oriented throughout said part.

11. The part of claim 8, wherein one of said first and said second reinforcing fibers are composite strands.

12. A composite part produced by the process comprising the steps of:
   providing continuous strand material including substantially linear, continuous reinforcing fibers, at least one of said reinforcing fibers being placed at an angle of from about 1° to about 90° to another of said reinforcing fibers;
   providing a mold having a cavity;
   selectively placing said continuous strand material in preselected locations in said mold cavity;
   providing a composite material containing discontinuous reinforcing fibers;
   adding said composite material to said mold cavity; and
   molding a composite part from said composite material and said strand material, said part having enhanced mechanical properties in desired areas due to said continuous strand material being located in said desired areas.

* * * * *